United States Patent
Tremaine et al.

(10) Patent No.: US 7,792,798 B2
(45) Date of Patent: Sep. 7, 2010

(54) DYNAMIC DATA COMPACTION FOR DATA REDISTRIBUTION

(75) Inventors: David Tremaine, Markham (CA); Leo T. M. Lau, Thronhill (CA); Adil Mohammad Sardar, Markham (CA); Philip Shawn Cox, Thornhill (CA)

(73) Assignee: International Business Machines Corporation, Armonk, NY (US)

(*) Notice: Subject to any disclaimer, the term of this patent is extended or adjusted under 35 U.S.C. 154(b) by 359 days.

(21) Appl. No.: 11/849,159

(22) Filed: Aug. 31, 2007

(65) Prior Publication Data

US 2009/0063526 A1    Mar. 5, 2009

(51) Int. Cl.
G06F 7/00    (2006.01)
G06F 17/00    (2006.01)

(52) U.S. Cl. .......... 707/636; 707/964; 707/966

(58) Field of Classification Search .......... 707/1–2, 707/8, 10, 100–102, 104.1, 200, 202, 609, 707/636, 821, 964, 966, 968
See application file for complete search history.

(56) References Cited

U.S. PATENT DOCUMENTS

| | | | |
|---|---|---|---|
| 6,026,412 A * | 2/2000 | Sockut et al. ............ | 1/1 |
| 6,185,666 B1 * | 2/2001 | Murray et al. ............ | 711/173 |
| 6,411,964 B1 * | 6/2002 | Iyer et al. ............ | 707/200 |
| 6,950,834 B2 * | 9/2005 | Huras et al. ............ | 707/202 |
| 7,016,904 B1 | 3/2006 | Grove et al. | |
| 7,103,608 B1 | 9/2006 | Ozbutun et al. | |
| 7,437,347 B1 * | 10/2008 | Chapman ............ | 1/1 |
| 7,577,637 B2 * | 8/2009 | Ghosh ............ | 1/1 |
| 2007/0162506 A1 * | 7/2007 | Grosman et al. ............ | 707/104.1 |
| 2009/0063394 A1 * | 3/2009 | Cox et al. ............ | 707/2 |

OTHER PUBLICATIONS

"Parallel Query Tuning," Oracle7 Tuning, Release 7.3.3, found at http://www.lsbu.ac.uk/oracle7/server/doc/A48506/pqo.htm, pp. 1-40.

Mohan, C., et al., "Algorithms for Flexible Space Management in Transaction Systems Supporting Fine-Granularity Locking," IBM Alameda Research Center and IBM Santa Teresa Laboratory, San Jose, California, pp. 131-144.

* cited by examiner

*Primary Examiner*—Don Wong
*Assistant Examiner*—Merilyn P Nguyen
(74) *Attorney, Agent, or Firm*—Sawyer Law Group, P.C.

(57) ABSTRACT

A method and system for optimizing data redistribution in a database. In one embodiment, the method includes moving, during a first scan, outgoing records from a sending partition to one or more receiving partitions, where free space is created in the sending partition due to the outgoing records leaving the sending partition. The method also includes filling, during the first scan, some of the free space with remaining records that do not leave the sending partition.

14 Claims, 3 Drawing Sheets

DYNAMIC DATA COMPACTION FOR DATA REDISTRIBUTION

FIELD OF THE INVENTION

The present invention relates to database systems, and more particularly to a method and system for optimizing data redistribution in a database.

BACKGROUND OF THE INVENTION

In a shared nothing architecture, each machine in a database cluster owns a portion of the data stored in the database cluster. This ownership is controlled by data partitioning. This data ownership needs to be altered in certain scenarios. For example, a business may need to expand the capacity of its database by adding more physical machines when the capacity of the database does not meet present or future need or when the existing data distribution does not meet business requirements.

When data ownership needs to be changed, existing data needs to be redistributed among machines in an operation referred to as data redistribution. The data redistribution operation becomes more frequent with data warehouse customers as the amount of data accumulates over time. In addition, as acquisitions and merges are becoming more popular, the need for more capacity also increases.

After data redistribution, data ownership is changed. As a result, records are moved from the sending machine to the receiving machine. After the records are removed from the sending machine, free space is left in the sending partition. This free space not only unnecessarily takes up storage but may also result in sub-optimal query performance. Therefore, another database operation referred to as table reorganization may be performed to utilize the free space. As a result, the overall cost of data redistribution in terms of both time, storage, and usability is negatively impacted by requiring table reorganization operations. This is an additional step that requires addition time and system resources to execute.

Accordingly, what is needed is an improved method and system for redistributing data. The present invention addresses such a need.

SUMMARY OF THE INVENTION

A method for optimizing data redistribution in a database is disclosed. In one embodiment, the method includes moving, during a first scan, outgoing records from a sending partition to one or more receiving partitions, where free space is created in the sending partition due to the outgoing records leaving the sending partition. The method also includes filling, during the first scan, some of the free space with remaining records that do not leave the sending partition. The method also includes filling some of the free space with incoming records that arrive from one or more other partitions. According to the method and system disclosed herein, database tables are maintained as compactly as possible after data redistribution.

DETAILED DESCRIPTION OF THE INVENTION

The present invention relates to database systems, and more particularly to a method and system for optimizing data redistribution in a database. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for optimizing data redistribution are disclosed. The method includes moving outgoing records from a sending partition to one or more receiving partitions, where free space is created in the sending partition due to the outgoing records leaving the sending partition. The method also includes filling some of the free space with remaining records that do not leave the sending partition. The method also includes filling some of the free space with incoming records that arrive from one or more other partitions. As a result, database tables are maintained as compactly as possible after data redistribution. To more particularly describe the features of the present invention, refer now to the following description in conjunction with the accompanying figures.

Figure 1:
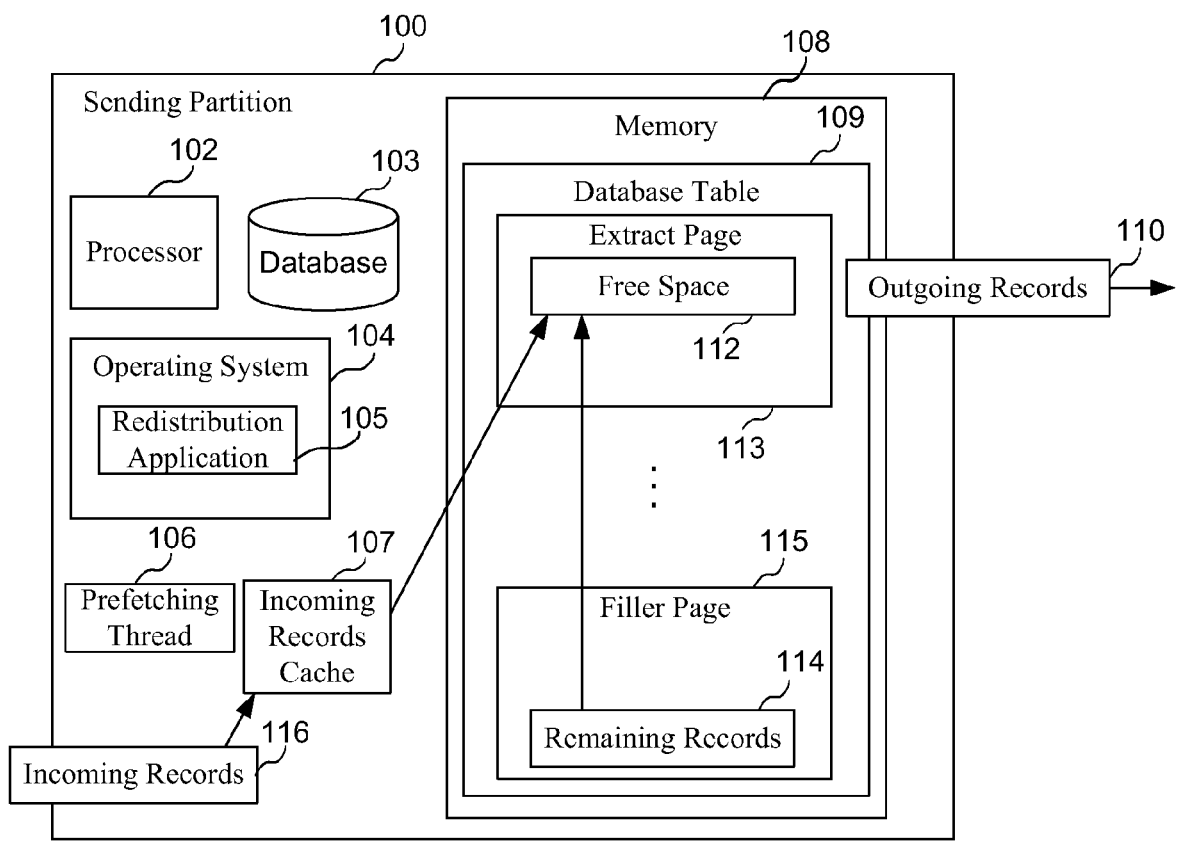
FIG. 1 is a block diagram of a partition in accordance with one embodiment of the present invention.

FIG. 1 is a block diagram of a partition 100 in accordance with one embodiment of the present invention. As FIG. 1 shows, the partition 100 includes a processor 102, a database 103, an operating system 104, a redistribution application 105, a prefetching thread 106, an incoming records cache 107, and a memory 108 that stores a database table 109 of records. In particular embodiments, the database table 109 in combination with other database tables at other partitions constitute a larger database table. The redistribution application 105 may be stored in a program library or in any suitable storage location or computer-readable medium. The redistribution application 105 provides instructions that enable the processor 102 to perform the functions described herein.

For ease of illustration, only one machine or system is shown. Embodiments of the present invention described herein also apply to multiple systems. For example, rows or records may be moved from one partition to one or more partitions on the same system, one or more partitions on a different system, or one or more partitions on a combination of the same system and one or more different systems.

Figure 2:
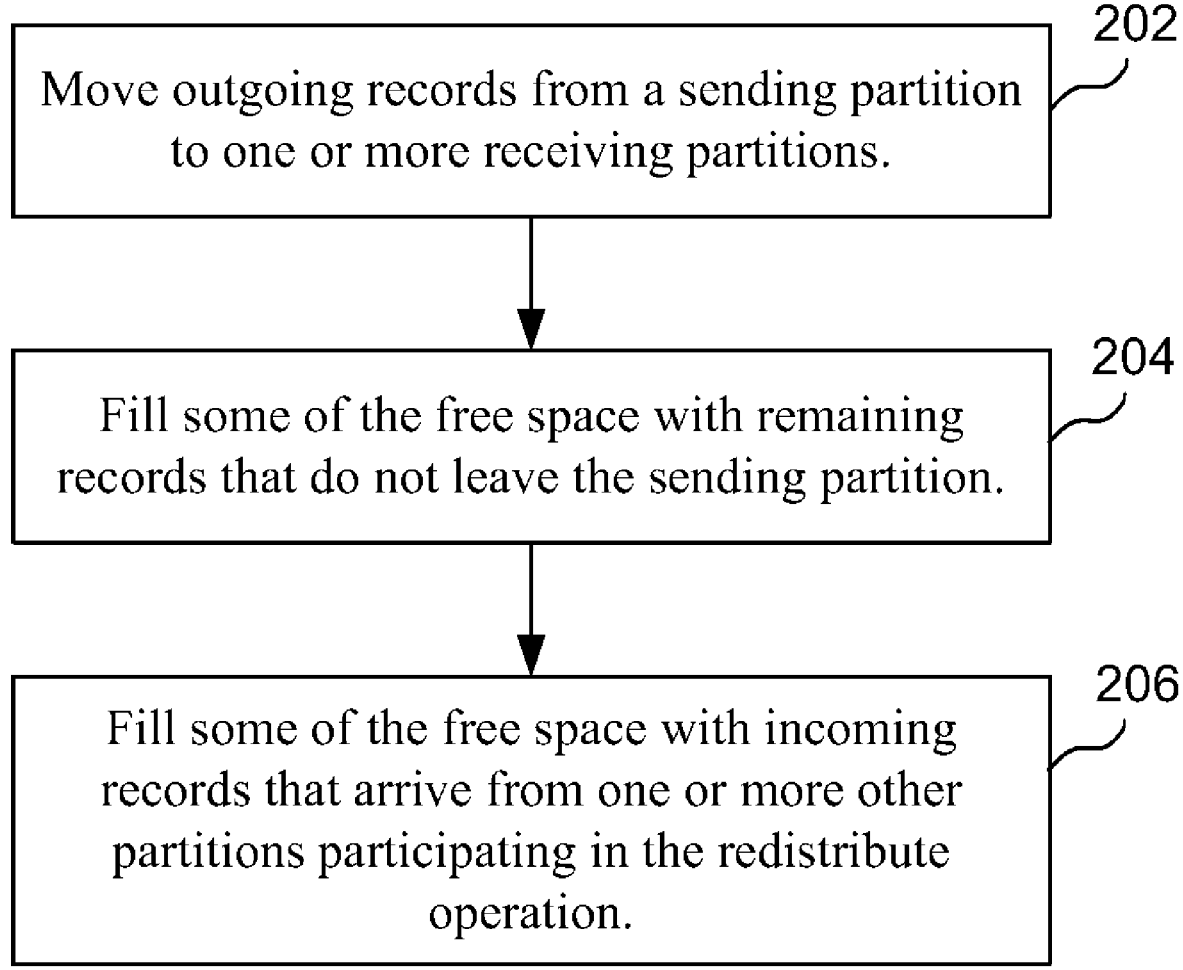
FIG. 2 is a flow chart showing a method for optimizing data redistribution in accordance with one embodiment of the present invention.

FIG. 2 is a flow chart showing a method for optimizing data redistribution in accordance with one embodiment of the present invention. Referring to both FIGS. 1 and 2, during step 202, the redistribution application 105 moves outgoing rows or records 110 of the table 108 from the sending partition 100 to one or more receiving partitions (not shown) during a redistribution process. In particular embodiments, a given machine may include one or more physical partitions. As such, during data redistribution, records may be moved from one partition to another on the same machine or on a different machine.

During data redistribution, holes or free spaces 112 in an extract page 113 are created in that partition of the database table 109 due to the outgoing records 110 that leave the sending partition 100. Embodiments of the present invention reclaim or fill free space of the database table recently created as a result from data redistribution of the table. Next, in step 204, the redistribution application 105 fills some of the free space 112 with remaining records 114 that do not leave the sending partition 100. In one embodiment, the ownership of the remaining records 114 does not change during data redistribution.

In one embodiment, the redistribution application 105 performs two scans on the database table 109, one scan from each end of the database table 109 (e.g., a forward scan from the top end of the database table 109 and or a reverse scan from the bottom end of the database table 109). In one embodiment, during a forward scan, the redistribution application 105 "extracts" each page, which means that the redistribution application 105 finds rows that are leaving (outgoing records) and sends or moves them to the one or more receiving partitions. Moving a given record results in empty or free space on the page. Note that it is possible for there to be pre-existing free space on the page, due how data was previously inserted. As described herein, the redistribution application 105 determines how to fill the free space. During the forward scan, as free space is created, the redistribution application 105 fills the free space. As described above, the redistribution application 105 fills some of the free space using the remaining records 114. As described in more detail below, the redistribution application 105 may also fill some free space using incoming records 116.

In one embodiment, the scans in both directions are deterministic in that the redistribution application 105 performs the scans of the pages in a predictable pattern. As such, the redistribution application 105 may perform a prefetching operation where the redistribution application 105 instructs the prefetching thread 106 to read or prefetch pages to be extracted into the database 103 or other suitable memory location. By utilizing prefetching, the redistribution application 105 is able to simultaneously process or extract the pages it currently has, while, in advance, reading in the next set of pages to be extracted. This decreases any redistribute wait time for pages.

In one embodiment, the application sends out the outgoing records 110 during a scan from each direction and identifies remaining records 114 from each direction. Also, during a scan in a given direction (e.g., forward scan), the redistribution application 105 may fill the free space 112 generated from that scan (e.g., forward scan) with the remaining records 114 found during a scan from the opposite direction (e.g., a reverse scan). In other words, records at one end of the table may be used to fill holes at the other end. As such, this process efficiently acquires the remaining records 114 to fill the free space 112.

In one embodiment, a similar process occurs during a second scan in the opposite direction. In one embodiment, the redistribution application 105 performs the two scans on the database table 109 simultaneously. In one embodiment, during the second scan, the redistribution application 105 gets remaining records 114 from pages at the bottom of the database table 109. The redistribution application 105 gets pages from the bottom of the database table 109, because these pages may be truncated or deleted from the database table 109 and reclaimed back to the database system to be used by other partitions. Also, getting records from the bottom of the database table 109 minimizes the number of rows that are moving, which saves on byte copying and index maintenance.

Next, in step 206, the redistribution application 105 fills some of the free space 112 with incoming records 116 that arrive at the sending partition 100 from one or more other partitions participating in the redistribute operation. In one embodiment, these incoming records 116 are initially stored in the incoming records cache 107 upon arrival. The redistribution application 105 may then fill the free space 112 with the incoming records 116 from the incoming records cache 107 during a scan from either end of the database table 109.

In one embodiment, the redistribution application 105 stores remaining records in a filler page 115 and subsequently fills the free space 112 created at a page from which records are currently extracted with the records stored in the filler page.

In one embodiment, while managing pages, the redistribution application 105 ensures that pages at the end of the database table 109 that are currently being used to fill free space are not conflicting with the pages currently being extracted by the forward scan. In one embodiment, the redistribution application 105 places remaining records from one end of the database table 109 in a filler page 115 and fills free space 112 at the other end of the database table 109 from which records are being extracted and sent out.

In one embodiment, the redistribution application 105 identifies and groups rows of the database table 109 that will remain in the sending partition 100 and that will be used to fill free space 112 on pages currently being processed by one of the scans such as the forward scan. In one embodiment, the redistribution application 105 may determine the ends of the table, and then identify and group records beginning from the bottom of the database table 109, moving upwards to the top of the database table 109. In one embodiment, the redistribution application 105 may keep one or more filler pages cached and then use that filler page to fill free space on another page from which the redistribution application 105 currently is extracting outgoing records.

Figure 3:
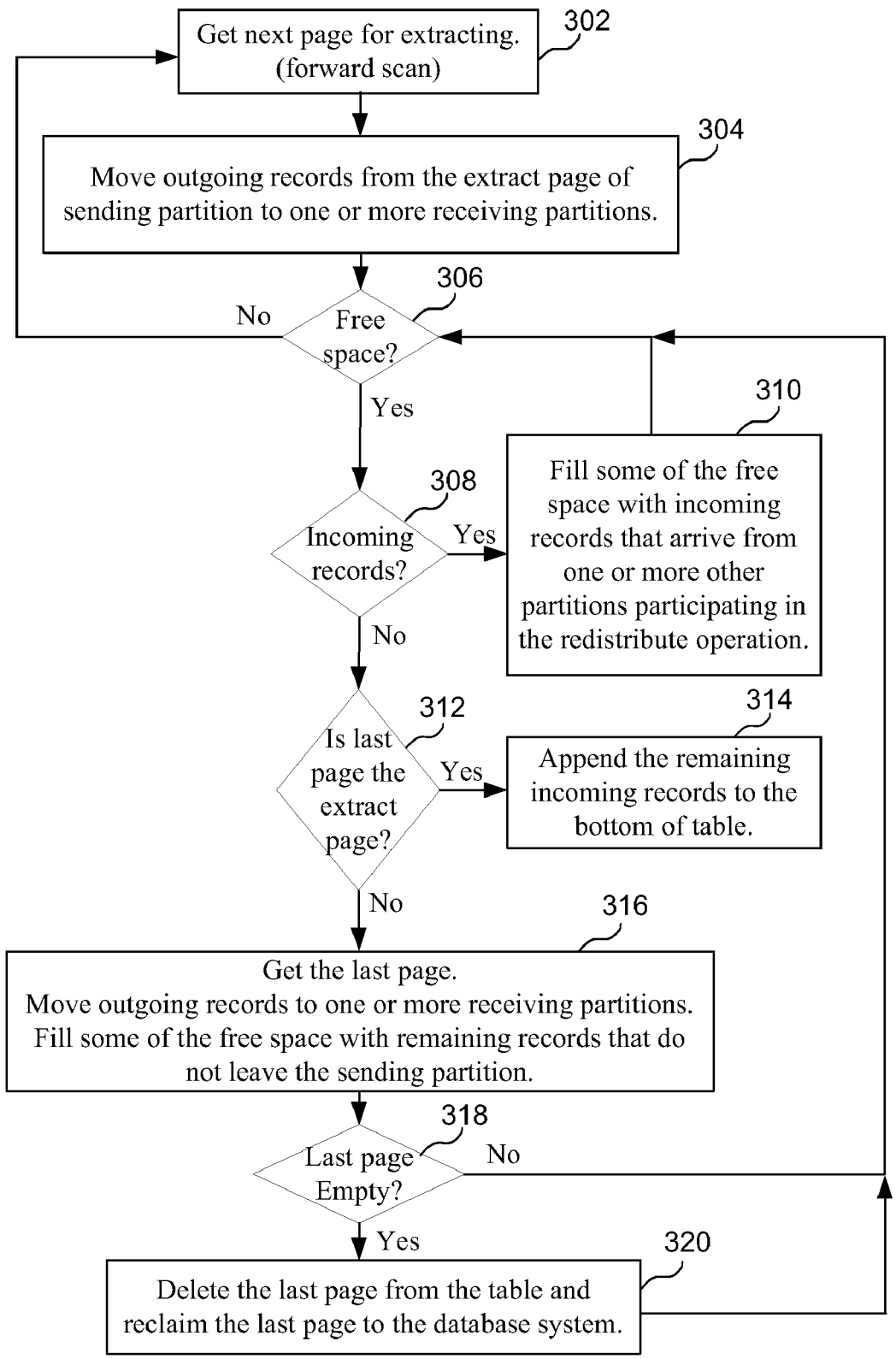
FIG. 3 is a flow chart showing a method for optimizing data redistribution in accordance with another embodiment of the present invention.

FIG. 3 is a flow chart showing a method for optimizing data redistribution in accordance with another embodiment of the present invention. In particular embodiments, redistribution application 105 performs a forward scan of each page and determines each page to be extracted. As such, the following method applies to each page left to be extracted. Referring to both FIGS. 1 and 3, during step 302, the redistribution application 105 gets the next page for extracting. For the current page 113, referred to as an extract page, the redistribution application 105 moves outgoing records 110 from the extract page 113 of sending partition 100 to one or more receiving partitions, in step 304. In step 306, the redistribution application 105 determines if there is free space on the extract page 113. If not, the redistribution application 105 checks if there is a next page for extracting, and if there is a next page, the redistribution application 105 gets the next page for extracting (step 302). If there is no next page, the process ends. In one embodiment, during a forward scan attempt to get the next page for extracting, if the redistribution application 105 finds that the next page is the filler page 115, the redistribution application 105 converts the filler page 115 the extract page 113. The redistribution application 105 will then perform the extraction logic on that extract page 113. When the redistribution application 105 tries to fill the page, it will hit the terminal case. If there is free space 112 on the extract page 113, in step 308, the redistribution application 105 determines if there are incoming records in the incoming records cache 107. If there are incoming records 116 in the incoming records cache 107, in step 310, the redistribution application 105 fills the free space 112 on the extract page 113 using the incoming records 116 and continues to fill the free space 112 using the incoming records 116 as long as there are incoming records and until all of the free space 112 is reclaimed. If there are no incoming records 116 in the incoming records cache 107, in step 312, the redistribution application 105 determines if the current last page of the database table 109 happens to be the extract page 113. Note that there are some scenarios where there are no incoming records 116, where the incoming records cache 107 remains empty. As such, the redistribution application 105 will fill free space in the extract pages using the remaining records 114. If the current last page of the database table 109 is the extract page 113, the two scans have intersected. This implies that there is no further filler page 115 to fill empty space and no further extract page 109. If this is true, in step 314, the redistribution application 105 appends the remaining incoming records 116, if any, to pages at the bottom of the database table 109.

If the current last page of the database table 109 is the extract page 113, in step 316, the redistribution application 105 gets the last page/extract 113, moves the outgoing records from the extract page 113 to one or more receiving partitions, and fills the free space with the remaining records that do not leave the sending partition.

Next, in step 318, the redistribution application 105 then determines if the last filler page is empty. If not, the redistribution application 105 determines if there is free space in the page (step 306). If the last filler page is empty, the redistribution application 105 deletes the filler page 115 from the database table 109 and reclaims the filler page 115 to the database system.

According to the system and method disclosed herein, the present invention provides numerous benefits. For example, embodiments of the present invention maintain a database table as compactly as possible after data redistribution, as there will not be free space after the data redistribution process. As such, table reorganization is not required after data redistribution.

A method and system in accordance with the present invention for optimizing data redistribution has been disclosed. The method includes moving outgoing records from a sending partition to one or more receiving partitions, where free space is created due to the outgoing records leaving the sending partition. The method also includes filling some of the free space with remaining records that do not leave the sending partition. The method also includes filling some of the free space with incoming records that arrive from one or more other partitions.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Accordingly, many modifications may be made by one of ordinary skill in the art without departing from the spirit and scope of the appended claims.

What is claimed is:

1. A method for optimizing data redistribution of a database table, the method comprising:
    moving, during a first scan, outgoing records from a sending partition to one or more receiving partitions, wherein free space is created in the sending partition due to the outgoing records leaving the sending partition;
    filling, during the first scan, some of the free space with remaining records that do not leave the sending partition wherein filling some of the free space further comprises filling some of the free space with incoming records that arrive from one or more other partitions; and
    performing a second scan on the database table, wherein the first scan is from a first end of database table and the second scan is from a second end of the database table;
    moving the outgoing records during the first scan from the first end of the database table; and
    filling some of the free space with remaining records during the second scan from the second end of the database table.

2. The method of claim 1 further comprising identifying holes and remaining records during the first and second scans.

3. The method of claim 1 wherein the first and second scans are performed simultaneously.

4. The method of claim 1 wherein records at one end of the table are used to fill holes at the other second end.

5. The method of claim 1 comprising:
    storing remaining records in a filler page in cache; and
    filling some free space with the remaining records stored in the filler page.

6. A computer-readable storage medium containing program instructions for optimizing data redistribution of a database table, the program instructions which when executed by a computer system cause the computer system to execute a method comprising:
    moving, during a first scan, outgoing records from a sending partition to one or more receiving partitions, wherein free space is created in the sending partition due to the outgoing records leaving the sending partition;
    filling, during the first scan, some of the free space with remaining records that do not leave the sending partition wherein filling some of the free space further comprises filling some of the free space with incoming records that arrive from one or more other partitions; and
    performing a second scan on the database table, wherein the first scan is from a first end of database table and the second scan is from a second end of the database table;
    moving the outgoing records during the first scan from the first end of the database table; and
    filling some of the free space with remaining records during the second scan from the second end of the database table.

7. The computer-readable storage medium of claim 6 wherein records at one end of the table are used to fill holes at the second end.

8. The computer-readable storage medium of claim 6 further comprising identifying holes and remaining records during the first and second scans.

9. The computer-readable storage medium of claim 8 wherein the first and second scans are performed simultaneously.

10. The computer-readable storage medium of claim 6 comprising:
   storing remaining records in a filler page in cache; and
   filling some free space with the remaining records stored in the filler page.

11. A system for optimizing data redistribution of a database table, the system comprising:
   a processor;
   a memory coupled to the processor;
   a database table stored in the memory, wherein the processor is operable to:
   move, during a first scan, outgoing records from a sending partition to one or more receiving partitions, wherein free space is created in the sending partition due to the outgoing records leaving the sending partition;
   fill, during the first scan, some of the free space with remaining records that do not leave the sending partition wherein during the fill of some of the free space the processor is further operable to fill some of the free space with incoming records that arrive from one or more other partitions;
   wherein the processor is further operable to perform a second scan on the database table, wherein the first scan is from a first end of database table and the second scan is from a second end of the database table;
   move the outgoing records during the first scan from the first end of the database table; and
   fill some of the free space with remaining records during the second scan from the second end of the database table.

12. The system of claim 11 wherein the processor is further operable to identifying holes and remaining records during the first and second scans.

13. The method of claim 12 wherein the first and second scans are performed simultaneously.

14. The system of claim 11 wherein records at one end of the table are used to fill holes at the second end.

* * * * *